United States Patent [19]
Fisli

[11] Patent Number: 5,243,359
[45] Date of Patent: Sep. 7, 1993

[54] RASTER OUTPUT SCANNER FOR A MULTISTATION XEROGRAPHIC PRINTING SYSTEM

[75] Inventor: Tibor Fisli, Los Altos Hills, Calif.
[73] Assignee: Xerox Corporation, Stamford, Conn.
[21] Appl. No.: 812,238
[22] Filed: Dec. 19, 1991
[51] Int. Cl.⁵ .................... G03G 15/01; G03G 15/04; G02B 26/10
[52] U.S. Cl. ..................................... 346/1.1; 346/108; 346/157; 359/204
[58] Field of Search ................ 355/326, 327; 346/108, 346/157, 1.1; 358/75; 359/204

[56] References Cited

U.S. PATENT DOCUMENTS

| | | | |
|---|---|---|---|
| 3,690,756 | 9/1972 | Smith | 355/327 |
| 4,424,442 | 1/1984 | Kitamura | 250/236 |
| 4,445,125 | 4/1984 | Scifres et al. | 346/108 |
| 4,474,422 | 10/1984 | Kitamura | 350/6.8 |
| 4,591,903 | 5/1986 | Kawamura et al. | 358/75 |
| 4,637,679 | 1/1987 | Funato | 350/6.5 |
| 4,761,046 | 8/1988 | Funato | 346/157 X |
| 4,847,642 | 7/1989 | Murayama et al. | 346/157 |
| 4,873,541 | 10/1989 | Hirose et al. | 346/160.1 |
| 4,903,067 | 2/1990 | Murayama et al. | 346/160 |
| 4,962,312 | 10/1990 | Matuura et al. | 250/236 |
| 5,068,677 | 11/1991 | Matsuura et al. | 346/108 |
| 5,181,137 | 1/1993 | Koide | 346/108 X |

OTHER PUBLICATIONS

W. T. Tsang entitled "CW Multiwavelength Traverse-Junction-Stripe Lasers Grown By Molecular Beam Epitaxy Operating Predominantly In Single-Longitudinal Modes," pp. 441–443 of vol. 36, No. 6, of Applied Physics Letter, Mar. 15, 1980.

Okuda et al. entitled "Simultaneous CW Operation of 5-Wavelength Integrated GainAsP/InP DFB Laser Array With 50 Å Lasing Wavelength Separation," pp. L904–L906, vol. 23, No. 12 of the Japanese Journal of Applied Physics, Dec. 1984.

Primary Examiner—Joan H. Pendegrass
Attorney, Agent, or Firm—John M. Kelly

[57] ABSTRACT

A single raster scanning system (ROS) with a rotating mirror, beneficially a polygon mirror, and a single set of scan optics suitable for use in a multistation xerographic printer. A plurality of clustered laser beams from the same spatial location, but of dissimilar wavelengths, are deflected using a common mirror surface area and are subsequently separated by a plurality of optical filter. The separated laser beams are then directed onto associated photoreceptors such that their optical path lengths from the source location to their photoreceptors are substantially the same.

10 Claims, 5 Drawing Sheets

RASTER OUTPUT SCANNER FOR A MULTISTATION XEROGRAPHIC PRINTING SYSTEM

The present invention relates to multistation xerographic printers utilizing a shared raster output scanner.

BACKGROUND OF THE PRESENT INVENTION

In xerographic printing (also called electrophotographic printing), a latent image is formed on a charged photoreceptor, usually by raster sweeping a modulated laser beam across the photoreceptor. The latent image is then used to create a permanent image by transferring and fusing toner that was electrostatically attracted to the latent image onto a recording medium, usually plain paper. While xerographic printing has been successful, problems arise when attempting to print at high speed. One set of problems relates to the sweeping of the laser beam across the photoreceptor.

As printing speed increases, it becomes more and more difficult to sweep the laser beam as fast as is required. While other methods are known, the most common method of sweeping the laser beam is to deflect it from a rotating mirror. One method of increasing the sweep speed is to rotate the mirror faster. While this method can increase the speed of the raster sweep, to rotate the mirror extremely fast requires an expensive drive motor and bearings.

Other techniques to increase the effective raster sweep speed are to 1) sweep the beam using a multifaceted, rotating polygon mirror having a set of related optics, or 2) sweep several beams simultaneously. Rotating polygon mirrors and their related optics are so common that they are generically referred to as ROSs (Raster Output Scanners), while printers that sweep several beams simultaneously are referred to as multispot printers. Both techniques are illustrated in U.S. Pat. No. 4,474,422 to Kitamura.

The sweep rate problem becomes even more apparent when printing multiple colors, such as in a full color print, at high speed. This is because a xerographic printer that prints in two or more colors requires a separate latent image for each color printed, hereinafter called a system color. While a two color printer requires only two latent images, a full color printer typically uses the three primary colors of cyan, magenta, yellow, plus black, and thus four latent images are required. Color prints are currently produced by sequentially transferring and fusing overlapped images of each system color onto a single recording medium that is passed multiple times, once for each system color, through the printer. Such printers are called multiple pass printers. Conceptually, one can imprint multiple colors on a recording medium that is passed through the system only once by using a sequence of multiple xerographic stations, one for each system color. Such a printer, called hereinafter a multistation printer, would have a greater output then a multipass printer operating at the same raster sweep speed. However, the introduction of multistation printers has been delayed by 1) cost problems, at least partially related to the cost of multiple xerographic stations and the associated ROSs, and 2) image quality problems, at least partially related to the difficulty of producing similar spots on each photoreceptor and subsequently registering (overlapping) the latent images on the photoreceptors.

Proposed prior art multistation printers have usually included individual ROSs (each comprised of separate polygon mirrors, lenses, and related optical components) for each station. For example, U.S. Pat. Nos. 4,847,642 and 4,903,067 to Murayama et al. involve such systems. Problems with these systems include the high cost of producing nearly identical multiple ROSs and the difficulty of registering the system colors.

A partial solution to the problems of multistation xerographic systems with individual ROSs is disclosed in U.S. Pat. No. 4,591,903 to Kawamura et al. The '903 patent, particularly with regards to FIG. 6, discusses a recording apparatus (printer) having multiple recording stations and multiple lens systems, but only one polygon mirror. With only one polygon mirror and associated drive motor, the cost of the system is reduced. However, differences in the lenses and mirror surfaces still could cause problems with color registration.

Another approach to overcoming the problems of multistation printers having individual ROSs is disclosed in U.S. Pat. No. 4,962,312 to Matuura et al. The '312 patent illustrates spatially overlapping a plurality of beams using an optical beam combiner, deflecting the overlapped beams using a single polygon mirror, separating the deflected beams using an optical filter (and polarizers if more than two beams are used), and directing the separated beams onto associated photoreceptors. The advantage of overlapping the laser beams is a significant cost reduction since the ROS is shared.

However, an actual embodiment of the '312 apparatus would be rather complicated and expensive, especially if four system colors are to be printed. The use of optical beam combiners to overlap beams so that they have similar optical axes would be difficult, expensive, and time consuming. Obtaining similar sized spots on each photoreceptor would be also be difficult as it would be difficult to establish the same optical path lengths for each beam. Finally, it would also be difficult to ensure that the latent images on the photoreceptors are registered. Each of these problems is at least partially related to the relative positions of the laser sources.

What is needed is a raster output scanner (ROS) system suitable for deflecting multiple laser beams in a multistation printer. The ROS should deflect multiple laser beams having substantially parallel optical axes by rotating a common mirror surface area, separate the deflected laser beams, and direct each beam onto its respective photoreceptor such that similarly dimensioned spots, each substantially in registration with spots on the other photoreceptors, are obtained.

SUMMARY OF THE PRESENT INVENTION

In accordance with the present invention there is provided a raster output scanning system (ROS) having a rotating polygon mirror which simultaneously deflects a plurality of clustered, dissimilar wavelength laser beams having common optical axes from common mirror surface areas. The clustered beams are subsequently separated by a plurality of optical filters and then directed onto associated photoreceptors of a multistation printer. Similarly dimensioned and registered spots are obtained on each photoreceptor, beneficially by establishing substantially similar optical path lengths for each beam. The first optical filter separates a first beam from the received beams and directs the remaining clustered beams into a second optical filter. The second optical filter separates a second beam from a third beam. If the first, second, or third beams are clustered with other beams, additional filters may be used to fully separate the beams. Preferably, the ROS includes devices, such as mirrors, to set each beams's optical path length the same.

In one embodiment, four modulated, clustered laser beams of dissimilar wavelength are reflected from a rotating polygon mirror and are subsequently separated by a first optical filter into first and second groups of two clustered beams each. The clustered beams in the first group are then separated by a second optical filter and the clustered beams in the second group are then separated by a third optical filter. The separated beams are directed onto their associated stations such that all optical path lengths are substantially the same and such that they are in registration.

BRIEF DESCRIPTION OF THE DRAWINGS

Other aspects of the present invention will become apparent as the following description proceeds and upon reference to the drawings, in which.

In the drawings, like references designate like elements.

DETAILED DESCRIPTION OF A RASTER OUTPUT SYSTEM (ROS)

While the present invention is described hereinafter in connection with a multistation printer having a single raster output scanner (ROS) that simultaneously deflects a plurality of clustered laser beams of dissimilar wavelengths, and that subsequently separates those beams and applies them to individual photoreceptors where similarly dimensioned and registered spots are produced, the present invention is not intended to be limited to that application. On the contrary, the present invention is intended to cover all alternatives, modifications and equivalents as may be included within the scope of the appended claims.

Figure 1:
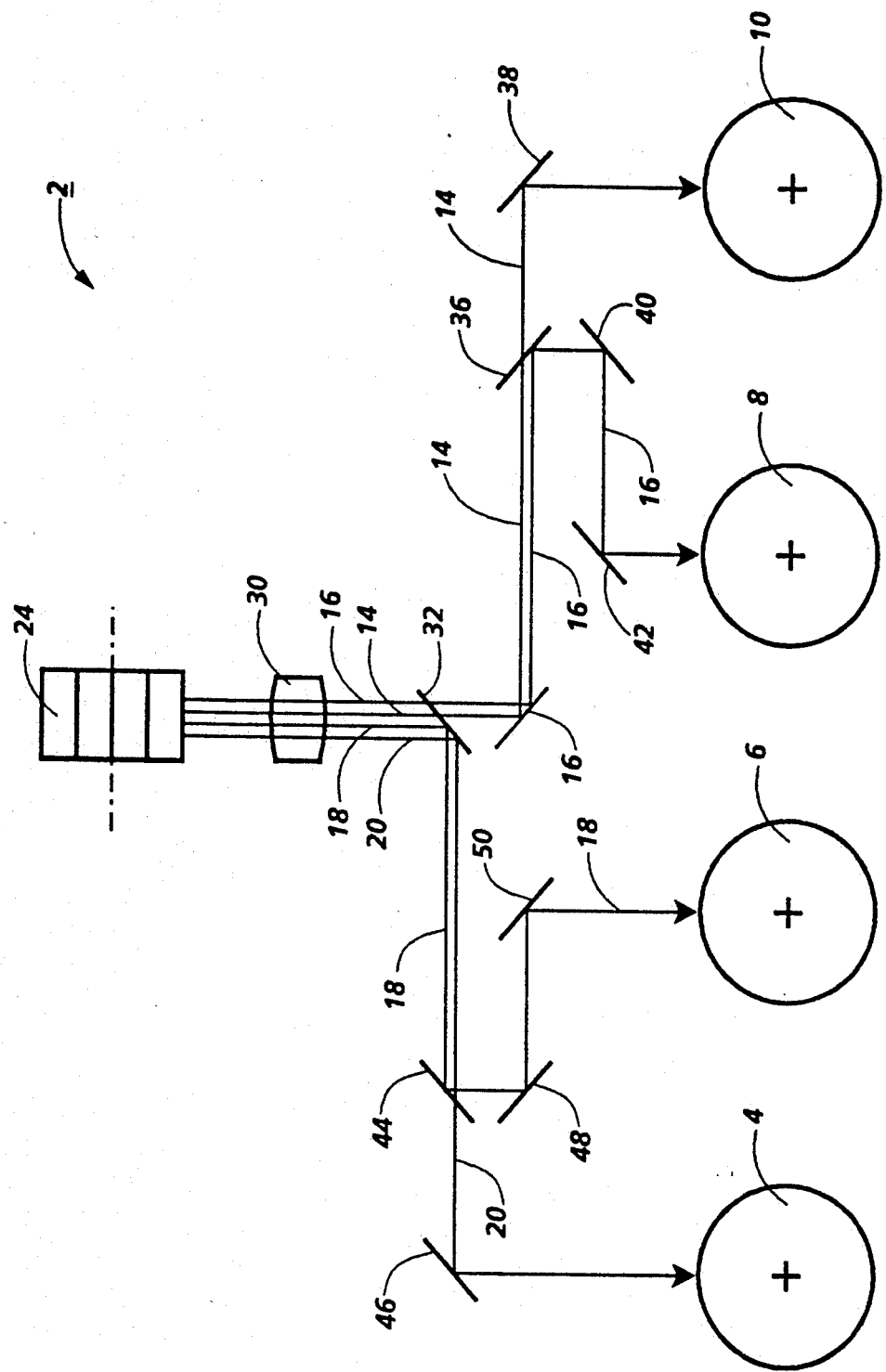
FIG. 1 is a simplified, schematic view of a raster output scanner (ROS) system according to an embodiment of the present invention.

FIG. 1 shows a simplified, schematic view of a multistation printer 2 that synchronously deflects dissimilar wavelength laser beams across four rotating photoreceptors, respectively photoreceptors 4, 6, 8, and 10. As the multistation printer 2 is for full color reproduction, each laser beam produces a latent image on its associated photoreceptor that corresponds to a system color that will be transferred onto a recording medium (not shown).

In FIG. 1, the deflected laser beams have substantially parallel optical axes and are tightly clustered. One possible technique for obtaining such beams is to overlap beams of different wavelength using dichroic prisms as optical combiners, as discussed in the previously mentioned U.S. Pat. No. 4,962,312. However, to reduce the problems of obtaining equal optical path lengths, to reduce the difficulty of spot registration, and to eliminate beam alignment problems, the multistation printer of FIG. 1 generates closely spaced, multiple wavelength laser beams using either a single structure or closely adjacent structures. Such multiple wavelength devices are described by W. T. Tsang in "CW MULTI-WAVELENGTH TRAVERSE-JUNCTION-STRIPE LASERS GROWN BY MOLECULAR BEAM EPITAXY OPERATING PREDOMINANTLY IN SINGLE-LONGITUDINAL MODES," pages 441-443 of volume 36, number 6, of Applied Physics Letter, Mar. 15, 1980; and by Okuda et al. in "SIMULTANEOUS CW OPERATION OF 5-WAVLENGTH INTEGRATED GaInAsP/InP DFB LASER ARRAY WITH 50 Å LASING WAVELENGTH SEPARATION," pages L904-L906, volume 23, number 12 of the Japanese Journal of Applied Physics, December 1984.

Figure 2:
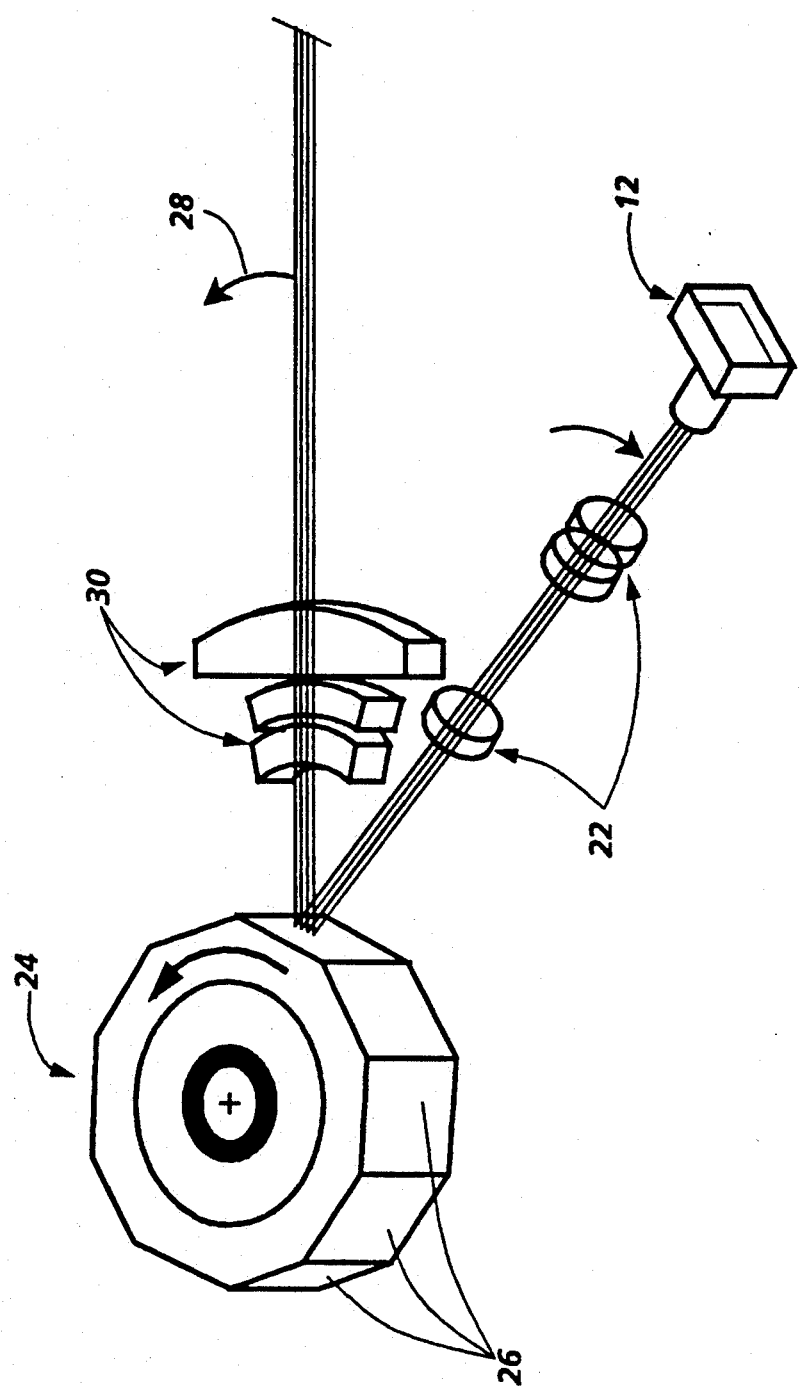
FIG. 2 is a perspective, schematic view illustrating the orientation of the laser sources, beam forming optics, and the rotating polygon mirror in FIG. 1.

Referring now to FIG. 2, the embodiment of FIG. 1 uses a device 12 that outputs four different wavelength laser beams, designated laser beams 14, 16, 18, and 20, at about 645, 755, 695, and 825 nanometers, respectively. For purposes of clarity, only the chief rays are shown. Device 12 effectively provides a substantially common spatial origin for each beam. Each beam is independently modulated so that it exposes its associated photoreceptor in accordance with a respective color image.

Still referring to FIG. 2, the four laser beams from device 12 are input to a conventional beam input optical system 22 which directs the beams onto an optical path such that they illuminate a rotating polygon mirror 24 having a plurality of facets 26. As the polygon mirror rotates, the facets cause the reflected beam to deflect repeatedly in the direction indicated by the arrow 28. The deflected laser beams are input to a single set of imaging and correction optics 30, which focuses the beams and corrects for errors such as polygon angle error and wobble.

Figure 3:
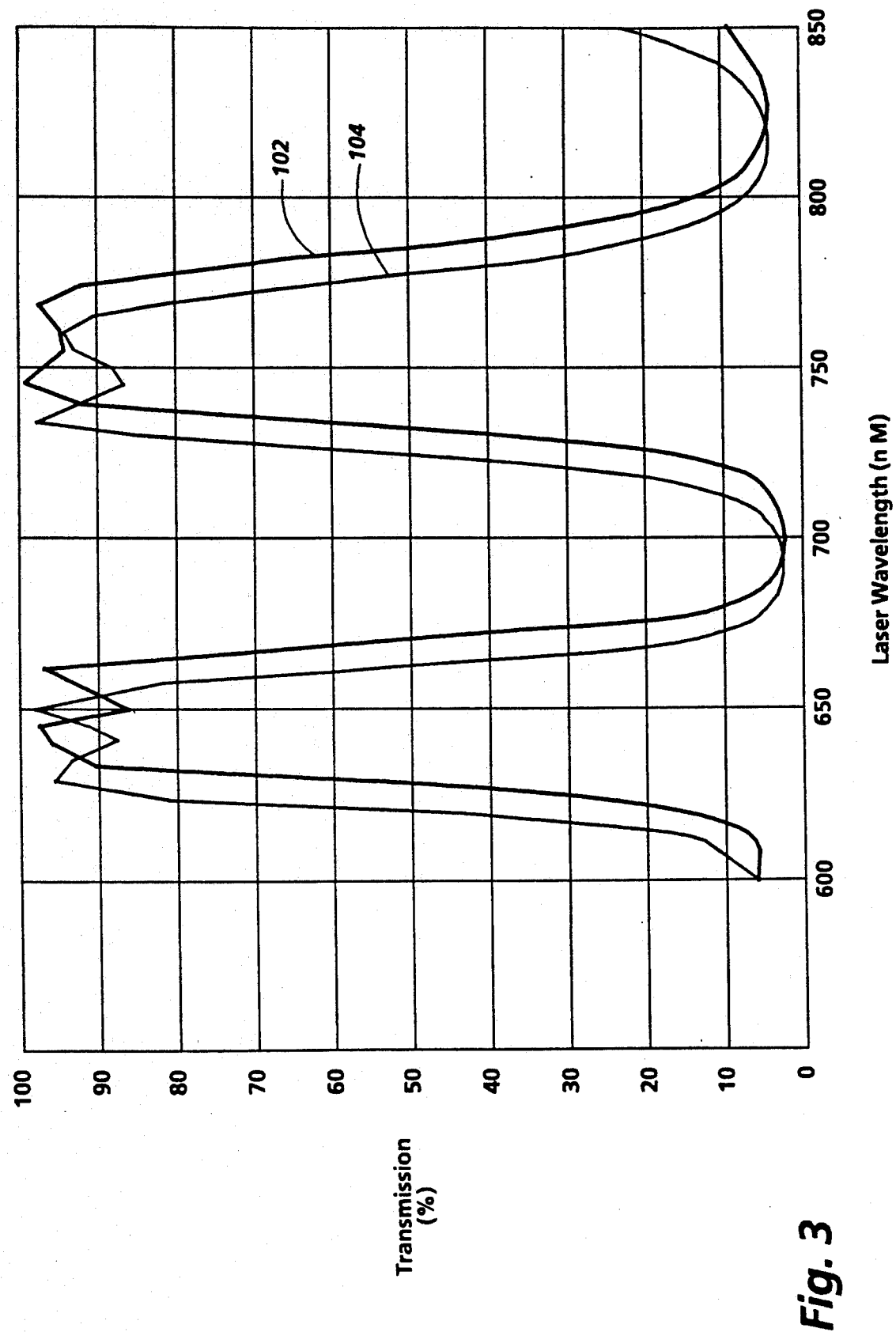
FIG. 3 shows the filter characteristics of the first optical filter of FIG. 1.

Referring again to FIG. 1, the four laser beams from the image and correction optics 30 are input to a first optical filter 32. The first optical filter is a dichroic mirror (color-selective beam splitter) comprised of a wavelength selective, multi-layer film such that it has the filter characteristics shown in FIG. 3. In FIG. 3, the curve 102 represents the characteristics of the first optical filter when the light strikes at a 45° angle of incidence, while curve 104 represents the filter's characteristics when the light strikes at a 60° angle of incidence. Such dichroic mirrors are well known and are discussed and described in Volume 1 of "Applied Optics and Optical Engineering," (1965) edited by R. Kingslake, in several places, including chapter 5, number IV and chapter 8, numbers VIII and IX. Because of the characteristics of the first optical filter 32, most of laser beams 14 (645 nanometers) and 16 (755 nanometers) are passed while most of the laser beams 18 (695 nanometers) and 20 (825 nanometers) are reflected.

Figure 4:
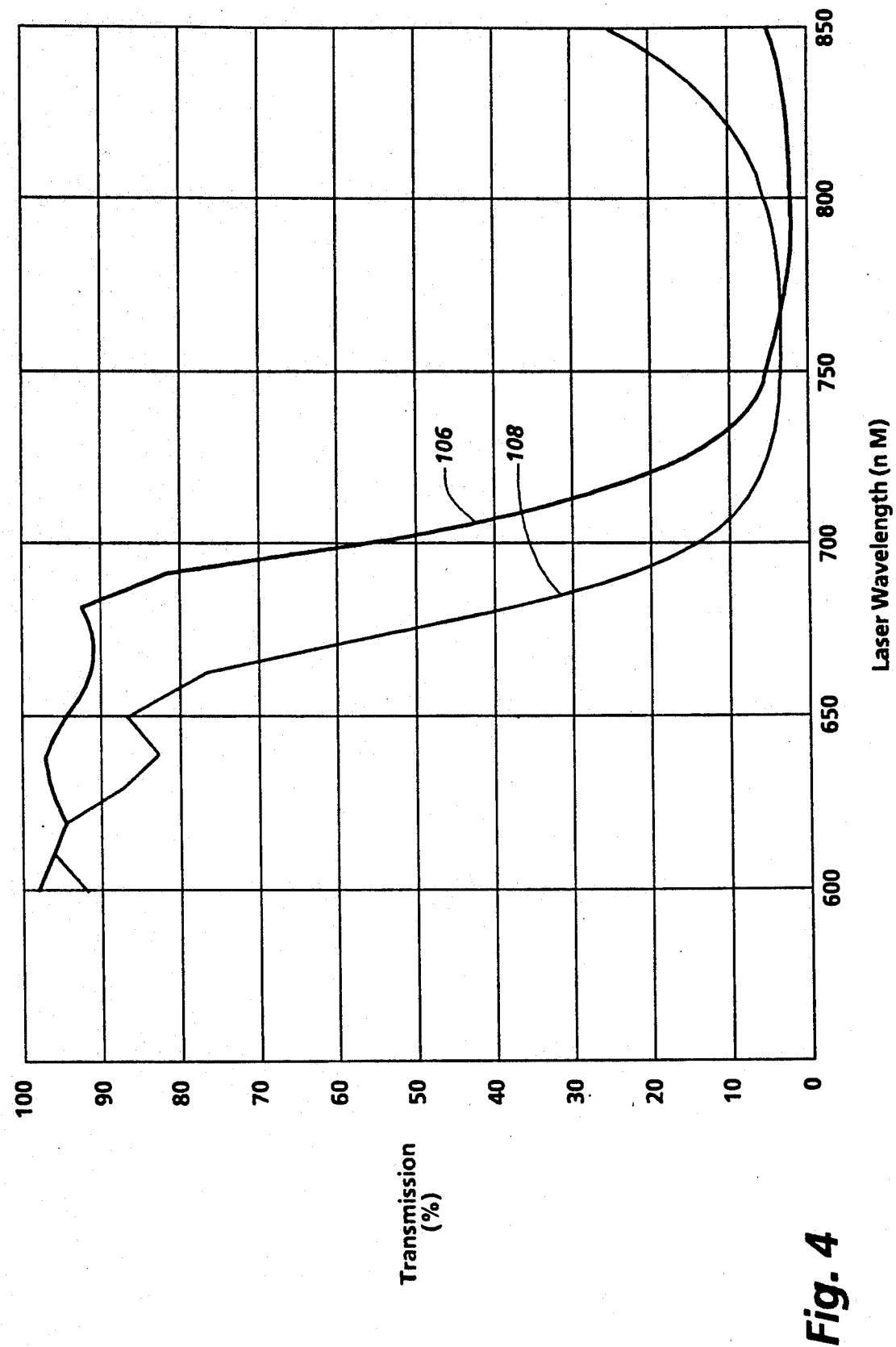
FIG. 4 shows the filter characteristics of the second optical filter of FIG. 1.

The passed laser beams 14 and 16 reflect off of a first mirror 34 onto a second optical filter 36. The second optical filter 36 is similar to the first optical filter 32 except that its wavelength selective, multi-layer film coating is adjusted to provide the filter characteristics shown in FIG. 4. In FIG. 4, the curve 106 represents the filter characteristics when the incident light strikes at a 45° angle of incidence, while the curve 108 represents the filter characteristics at a 60° angle of incidence. Because of its filter characteristics, the second optical filter 36 passes laser beam 14 (645 nanometers) while it reflects laser beam 16 (755 nanometers). The passed laser beam 14 is reflected from a second mirror 38 onto the photoreceptor 10, while the reflected laser beam 16 is reflected from a third mirror 40 and a fourth mirror 42 onto the photoreceptor 8.

Figure 5:
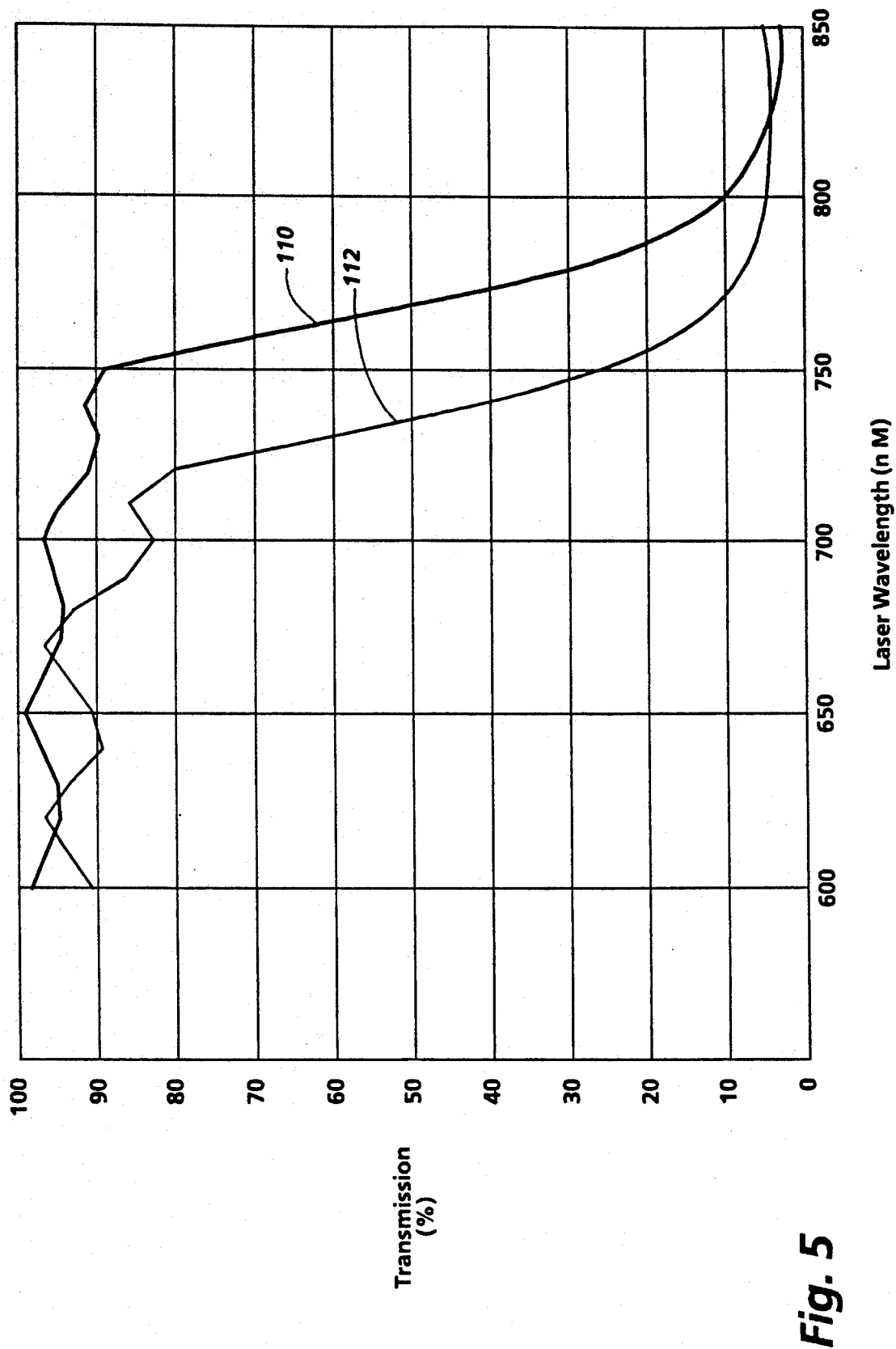
FIG. 5 shows the filter characteristics of the third optical filter of FIG. 1.

The reflected laser beams from the first optical filter, laser beams 18 and 20, are input to a third optical filter 44. The third optical filter 44 is similar to the first and second optical filters except that its wavelength selective, multi-layer film coating is adjusted so that the filter characteristics shown in FIG. 5 are obtained. In FIG. 5, the curve 110 represents the filter characteristics when the light strikes at a 45° angle of incidence while the curve 112 represents the filter characteristics with a 60° angle of incidence. Because of its filter characteristics, the third optical filter 44 passes laser beam 20 (825 nanometers) while it reflects laser beam 18 (695 nanometers). The passed laser beam 20 reflects from a fifth mirror 46 onto the photoreceptor 4 while the reflected laser beam 18 reflects from a sixth mirror 48 and a seventh mirror 50 onto the photoreceptor 6.

Since the system illustrated in FIG. 1 simultaneously forms, sweeps, and corrects each beam, and since each beams is from substantially the same spatial location and have substantially parallel optical axes, similarly dimensioned beams are input to the first optical filter. Thus the problem of maintaining equal optical path lengths for each beam reduces to the much simpler problem of maintaining the optical path lengths from the first filter 32 to the photoreceptors. By properly adjusting the optical path lengths after the first optical filter, in FIG. 1 by using mirrors 38, 40, 42, 46, 48, and 50, the optical path lengths are set the same. This results in similarly dimensioned spots at each photoreceptor. Additionally, the problem of registration is reduced since a common mirror surface area and related optics sweep and form the beams, the characteristics of these components are shared. Thus the beams spots can easily be caused to be in registration.

While the foregoing described an improved method and apparatus for raster output scanning in a multistation xerographic printer, it is evident that many alternatives, modifications and variations will be apparent to those skilled in the art. Accordingly, it is intended that the present invention embrace all alternatives, modifications and variations that fall within the spirit and scope of the appended claims.

What is claimed:

1. A raster output scanner for a multistation printer having clustered first, second and third laser beams of dissimilar wavelengths and first, second, and third photoreceptors, comprising:
   means for simultaneously deflecting the clustered first, second, and third laser beams onto a first optical path;
   a first optical filter disposed on said first optical path, said first optical filter for directing the first laser beam onto a disparate second optical path and for directing the second and third laser beams onto a disparate third optical path; and
   a second optical filter disposed on said third optical path, said second optical filter for directing the second laser beam onto a disparate fourth optical path and the third laser beam onto a disparate fifth optical path.

2. The raster output scanner of claim 1, wherein said first, second, and third laser beams are from a substantially common spatial location.

3. The raster output scanner of claim 2 wherein said first, second, and third laser beams create first, second, and third spots on said first, second, and third photoreceptors.

4. The raster output scanner of claim 3, further including a plurality of mirrors for adjusting the dimensions of said first, second, and third spots.

5. A raster output scanning apparatus for a multistation xerographic printer having clustered first, second, third, and fourth laser beams of dissimilar wavelengths, comprising:
   means for simultaneously deflecting the first, second, third, and fourth laser beams onto a first optical path;
   a first optical filter disposed on said first optical path, said first optical filter for separating the first and second laser beams from the third and fourth laser beams, for directing said first and second laser beams onto a second optical path, and for directing said third and fourth laser beams onto a third optical path;
   a second optical filter disposed on said second optical path, said second optical filter for separating the second laser beam from the first laser beam, for directing the first laser beam onto a fourth optical path, and for directing the second laser beam onto a fifth optical path; and
   a third optical filter disposed on said third optical path, said third optical filter for separating the fourth laser beam from the third laser beam, for directing the third laser beam onto a sixth optical path, and for directing the fourth laser beam onto a seventh optical path.

6. The apparatus according to claim 5, further including a mirror for adjusting the optical path length of at least one laser beam.

7. A multistation printer, comprising:
   means for producing a plurality of laser beams having different wavelengths from substantially the same location:
   means for clustering said plurality of laser beams such that they overlap and share a substantially common optical axes;
   means for simultaneously deflecting the clustered laser beams across a first optical path;
   a first optical filter disposed on said first optical path, said first optical filter sending a first laser beam of said plurality of laser beams onto a second optical path and sending a second laser beam of said plurality of laser beams onto a third optical path;
   first means for receiving said first laser beam and for directing said first laser beam onto a first photoreceptor along a fourth optical path;
   second means for receiving said second laser beam and for directing said second laser beam onto a second photoreceptor; and
   at least one mirror on said fourth optical path for adjusting the optical path length from said first optical filter to said first photoreceptor to be substantially the same as the optical path length from said first optical filter to said second photoreceptor.

8. A raster output scanner for a multistation printer, comprising:
   a laser source outputting first and second laser beams having dissimilar characteristics from a substantially common spatial location;
   a lens system for clustering said first and second laser beams together;

means for simultaneously deflecting said clustered first and second laser beams onto a first optical path;

a first beam separator disposed on said first optical path, said first beam separator for directing said first laser beam onto a disparate second optical path and for directing said second laser beam onto a disparate third optical path;

a first photoreceptor in said second optical path for receiving said separated first laser beam;

a second photoreceptor in said third optical path for receiving said separated second laser beam;

a mirror in said second optical path between said first beam separator and said first photoreceptor for adjusting said second optical path to be substantially the same as said third optical path.

9. The apparatus according to claim 8, wherein said first and said second photoreceptors are different areas of a common surface.

10. A method of creating multiple, similarly dimensioned spots in a laser printer, comprising the steps of:

generating first and second laser beams having dissimilar characteristics from a substantially common spatial location;

clustering said first and second laser beams together so that they have substantially parallel optical axis;

deflecting said clustered first and second laser beams onto a first optical path;

separating said swept and clustered first and second laser beam;

applying said first separated laser beam to a first surface;

reflecting said second separated laser beam from a mirror;

applying said reflected second laser beam to a second surface; and positioning said mirror such that the optical path length from said laser source to said second surface is substantially the same as the optical path length from said laser source to said first surface.

* * * * *